(12) United States Patent
Choi et al.

(10) Patent No.: US 9,528,047 B2
(45) Date of Patent: Dec. 27, 2016

(54) LIQUID CRYSTAL DISPLAY DEVICE

(71) Applicant: LG Display Co., Ltd., Seoul (KR)

(72) Inventors: WooYoung Choi, Goyang-si (KR); JiHo Baek, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/464,204

(22) Filed: Aug. 20, 2014

(65) Prior Publication Data
US 2015/0344783 A1    Dec. 3, 2015

(30) Foreign Application Priority Data

May 29, 2014  (KR) ........................ 10-2014-0064954

(51) Int. Cl.
*G02F 1/1333* (2006.01)
*C09K 19/54* (2006.01)
*G02F 1/1343* (2006.01)

(52) U.S. Cl.
CPC .......... *C09K 19/54* (2013.01); *G02F 1/134309* (2013.01); *G02F 1/134363* (2013.01); *G02F 2001/134372* (2013.01)

(58) Field of Classification Search
CPC .......... C09K 19/54; G02F 1/134; G02F 1/309; G02F 1/1333; G02F 1/134363; G02F 2001/134372
USPC ............................................. 428/1.1
See application file for complete search history.

(56) References Cited

U.S. PATENT DOCUMENTS

2013/0258268 A1* 10/2013 Goebel .............. C09K 19/3003
349/186

* cited by examiner

*Primary Examiner* — Geraldina Visconti
(74) *Attorney, Agent, or Firm* — Dentons US LLP

(57) ABSTRACT

Disclosed is a liquid crystal display device having an improved picture quality by overcoming a problem of residual images through the use of a liquid crystal layer including an additive therein. The liquid crystal display device may include a first substrate, a second substrate facing the first substrate, and the liquid crystal layer between the first and second substrates, wherein the liquid crystal layer includes liquid crystal molecules, and the additive for preventing a reaction between the liquid crystal molecules and impurities.

5 Claims, 6 Drawing Sheets

FIG. 1

Related Art

FIG. 2

| TYPE | NAME | STRUCTURE |
|---|---|---|
| Binder | Styrene | |
| Acrylate | Methyl methacrylate | |
| | Butyl methacrylate | |
| | Benzyl methacrylate | |
| Alcohol | Benzyl alcohol | |
| | 2-Ethyl hexanol | |
| Aldehyde | Benzaldehyde | |
| Acid | Methacrylic acid | |
| | Benzoic acid | |
| Photoinitiator | Acetophenone | |
| | Benzylethyl ketone | |
| Disperser | 5-Valerolactone | |
| | 2-Oxepanone | |
| Solvent | NMP | |
| Amine | 4-Chloro aniline | |
| Amide | 2-Chloro benzamide | |

LIQUID CRYSTAL DISPLAY DEVICE

CROSS REFERENCE TO RELATED APPLICATIONS

This application claims the benefit of the Korean Patent Application No. 10-2014-0064954 filed on May 29, 2014, which is hereby incorporated by reference for all purposes as if fully set forth herein.

BACKGROUND

Field of the Disclosure

Embodiments of the present invention relate to a liquid crystal display (LCD) device. More particularly, the embodiments relate to an LCD device that helps to overcome problems related to residual images.

Discussion of the Related Art

Because of advantages such as good portability, low power consumption, and low operating voltage, the LCD device is widely used in various fields such as notebook computers, monitors, spacecraft, aircraft, etc.

The LCD device includes a lower substrate, an upper substrate, and a liquid crystal layer formed between the lower and upper substrates. According to whether or not an electric field is applied, light transmittance is controlled by alignment of the liquid crystal layer, to thereby display images.

According to a method for controlling an alignment of the liquid crystal layer in the LCD device, the LCD device may be developed in various modes, for example, Twisted Nematic (TN) mode, Vertical Alignment (VA) mode, In-Plane Switching (IPS) mode, Fringe Filed Switching (FFS) mode, and etc.

Among the above modes, in case of the IPS mode and the FFS mode, both pixel and common electrodes are arranged on a lower substrate, whereby the alignment of liquid crystal layer may be controlled by an electric field between pixel and common electrodes.

In case of the IPS mode, pixel and common electrodes are alternately arranged in parallel, whereby a horizontal electric field is generated between the pixel and common electrodes, to thereby control the alignment of liquid crystal layer. In case of the FFS mode, pixel and common electrodes are provided at a predetermined interval by the use of insulating layer interposed therebetween, wherein one electrode is formed in a plate shape, and the other electrode is formed in a finger shape, whereby the alignment of liquid crystal layer is controlled by a fringe field occurring between the pixel and common electrodes.

Hereinafter, a related art IPS mode LCD device will be described.

Figure 1:
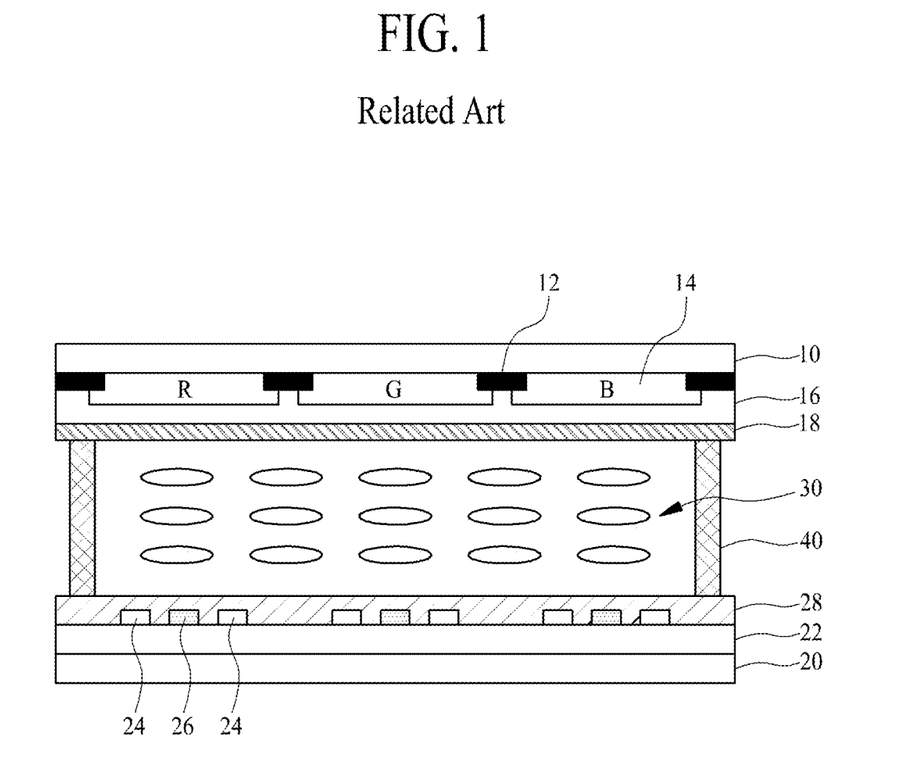
FIG. 1 is a cross sectional view illustrating a related art IPS mode LCD device.

FIG. 1 is a cross sectional view illustrating a related art IPS mode LCD device.

As shown in FIG. 1, the related art IPS mode LCD device may include an upper substrate 10, a lower substrate 20, a liquid crystal layer 30, and a sealant 40.

On the upper substrate 10, there are a light shielding layer 12, a color filter layer 14, an overcoat layer 16, and an upper alignment film 18 which are formed in sequence.

The light shielding layer 12 prevents light from leaking in other regions except pixel regions, wherein the light shielding layer 12 is formed in a matrix configuration. The color filter layer 14 is formed on the light shielding layer 12. The color filter layer 14 includes red (R), green (G), and blue (B) color filters. The overcoat layer 16 is formed on the color filter layer 14, wherein the overcoat layer 16 is provided to planarize the substrate. The upper alignment film 18 is provided for an initial alignment direction of the liquid crystal layer 30, and the upper alignment film 18 is aligned in a predetermined direction.

On the lower substrate 20, there are an array layer 22, a pixel electrode 24, a common electrode 26, and a lower alignment film 28.

Although not shown, the array layer 22 may include gate and data lines crossing each other to define the pixel region, and a thin film transistor formed adjacent to a crossing region of the gate and data lines. The pixel electrode 24 is formed on the array layer 22, and the pixel electrode 24 is electrically connected with the thin film transistor in the array layer 22. The common electrode 26 is formed on the array layer 22. Also, the common electrode 26 together with the pixel electrode 24 forms an electric field to drive the liquid crystal layer 30. The lower alignment film 28 is provided for an initial alignment direction of the liquid crystal layer 30, and the lower alignment film 28 is aligned in a predetermined direction.

The liquid crystal layer 30 is formed between the upper substrate 10 and the lower substrate 20. The liquid crystal layer 30 is provided in such a manner that its alignment state is controlled by a direction of electric field formed by the pixel electrode 24 and the common electrode 26.

The sealant 40 is formed between the upper substrate 10 and the lower substrate 20, wherein the sealant 40 adheres the upper substrate 10 and the lower substrate 20 to each other.

However, the related art IPS mode LCD device is disadvantageous in that a picture quality is deteriorated due to the change in properties of liquid crystal molecules included in the liquid crystal layer 30. That is, the liquid crystal molecules are formed of a mixture of various chemical substances. Some of the chemical substances may undesirably react to impurities included in the liquid crystal layer 30, whereby driving properties of the liquid crystal molecules may be changed, and thus residual images may remain when displaying images.

This will be described in detail as follows.

First, impurities may be produced for a process of preparing the liquid crystal molecules, and thus the impurities together with the liquid crystal molecules may be included in the liquid crystal layer 30. In this case, the liquid crystal molecules may react to the impurities by heat or ultraviolet (UV) rays, which may cause the change in properties of liquid crystal molecules.

Examples of the impurities produced for the process of preparing the liquid crystal molecules are shown as follows. Generally, liquid crystal compounds are made by reaction of intermediate products. If the liquid crystal compounds corresponding to end products are not produced by 100% reaction of the intermediate products, the liquid crystal layer 30 is formed by the mixture of the intermediate products and the liquid crystal compounds corresponding to the end products. In this case, the intermediate products function as the impurities, which causes the change on properties of the liquid crystal molecules.

Also, components included in elements for the LCD device, for example, the light shielding layer 12, color filter layer 14, overcoat layer 16, upper alignment film 18, lower alignment film 28, and sealant 40 may come into contact with the liquid crystal layer 30 due to various reasons, that is, the above components may serve as the impurities. Accordingly, the properties of liquid crystal molecules may be changed by the reaction between the impurities and the liquid crystal molecules.

Figure 2:
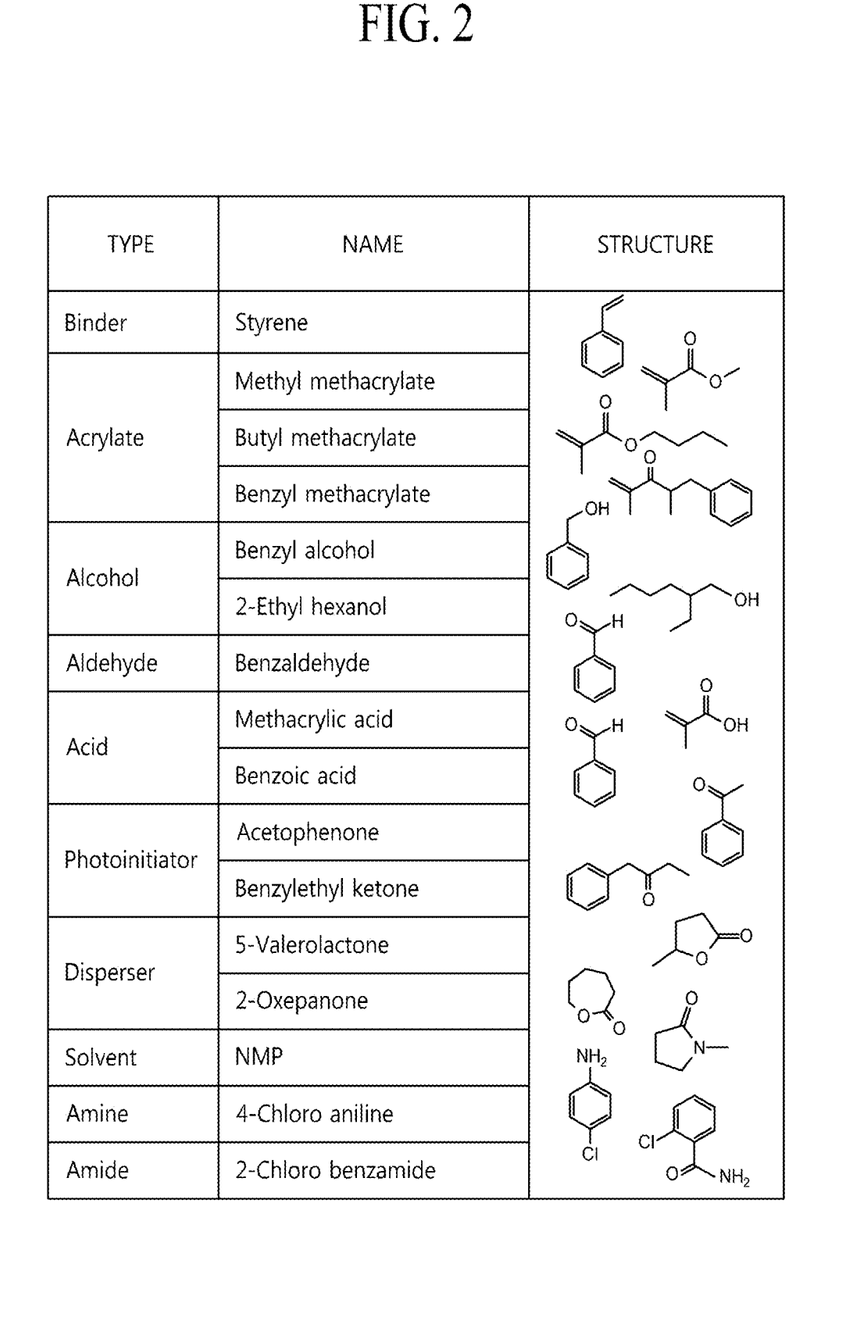
FIG. 2 is a table showing substances corresponding to components included in elements for the LCD device, which come into contact with a liquid crystal layer and thus serve as impurities in the liquid crystal layer.

FIG. 2 is a table showing the substances corresponding to the components included in elements for the LCD device, which come into contact with the liquid crystal layer 30, and thus serve as the impurities in the liquid crystal layer 30. As shown in FIG. 2, various types of substances may come into contact with the liquid crystal layer 30, and cause the change in properties of the liquid crystal molecules.

SUMMARY

Accordingly, embodiments of the present invention are directed to a liquid crystal display device that substantially obviates one or more problems due to limitations and disadvantages of the related art.

An aspect of embodiments of the present invention is directed to provide a liquid crystal display device having an improved picture quality by preventing a reaction between impurities included in a liquid crystal layer and liquid crystal molecules, and thus preventing a change on properties of the liquid crystal molecules.

Additional advantages and features of embodiments of the invention will be set forth in part in the description which follows and in part will become apparent to those having ordinary skill in the art upon examination of the following or may be learned from practice of embodiments of the invention. These and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a liquid crystal display device that may include a first substrate, a second substrate facing the first substrate, and a liquid crystal layer between the first and second substrates, wherein the liquid crystal layer includes liquid crystal molecules, and an additive for preventing a reaction between the liquid crystal molecules and impurities.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of embodiments of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 3:
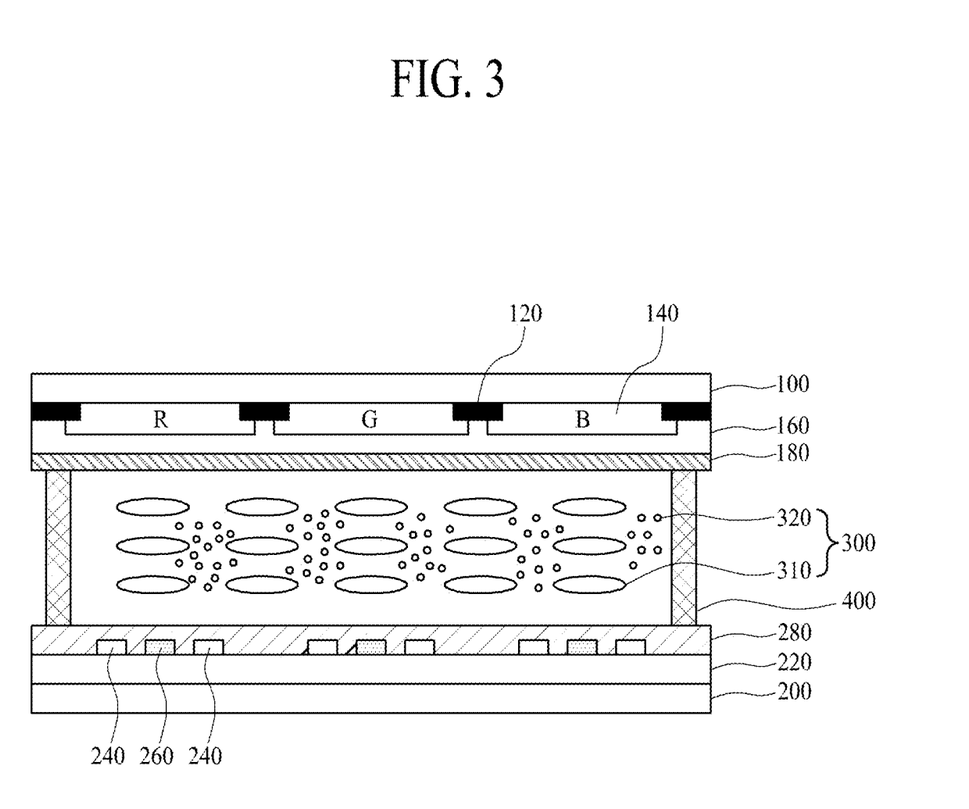
FIG. 3 is a cross sectional view illustrating an LCD device according to one embodiment of the present invention.

FIG. 3 is a cross sectional view illustrating an LCD device according to one embodiment of the present invention, which relates to an IPS mode LCD device.

As shown in FIG. 3, the LCD device according to one embodiment of the present invention may include a first substrate 100, a second substrate 200, a liquid crystal layer 300, and a sealant 400.

On the first substrate 100, there are a light shielding layer 120, a color filter layer 140, an overcoat layer 160, and a first alignment film 180 which are sequentially formed thereon.

The light shielding layer 120 prevents light from leaking in other regions except pixel regions, wherein the light shielding layer 120 is formed in a matrix configuration.

The color filter layer 140 is formed on the light shielding layer 120. The color filter layer 140 includes red (R), green (G), and blue (B) color filters. If needed, the color filter layer 140 may include additional yellow (Y) or cyan (Cyan) color filter.

The overcoat layer 160 is formed on the color filter layer 140, wherein the overcoat layer 160 is provided to planarize the substrate.

The first alignment film 180 is provided for an initial alignment direction of the liquid crystal molecules 310 in the liquid crystal layer 300, and the first alignment film 180 is aligned in a predetermined direction.

Although not shown, a column spacer for maintaining a cell gap may be additionally provided between the overcoat layer 160 and the first alignment film 180.

On the second substrate 200, there are an array layer 220, a pixel electrode 240, a common electrode 260, and a second alignment film 280.

Although not shown, the array layer 220 may include gate and data lines crossing each other to define the pixel region, and a thin film transistor formed at a crossing region of the gate and data lines.

The pixel electrode 240 is formed on the array layer 220, and the pixel electrode 240 is electrically connected with the thin film transistor in the array layer 220.

The common electrode 260 is formed on the array layer 220. Also, the common electrode 260 together with the pixel electrode 240 forms an electric field to drive the liquid crystal molecules 310 of the liquid crystal layer 300.

The pixel electrode 240 and the common electrode 260 are alternately arranged to form a horizontal electric field. The pixel electrode 240 and the common electrode 260 may be formed in the same layer or different layers.

The second alignment film 280 is provided for an initial alignment direction of the liquid crystal molecules 310 in the liquid crystal layer 300, and the second alignment film 280 is aligned in a predetermined direction. In this case, an alignment direction of the second alignment film 280 may be the same as or different from an alignment direction of the first alignment film 180.

The liquid crystal layer 300 is formed between the first substrate 100 and the second substrate 200. The liquid crystal layer 300 may include the liquid crystal molecules 310 and an additive 320 therein.

The liquid crystal layer 300 may be obtained by preparing a mixture of various kinds of unit chemical substance constituting the liquid crystal molecules 310, and adding the additive 320 to the prepared mixture; or may be obtained by mixing the additive 320 and various kinds of unit chemical substance constituting the liquid crystal molecules 310.

The alignment state of liquid crystal molecules 310 may be controlled in accordance with a direction of electric field formed by the pixel electrode 240 and the common electrode 260.

The liquid crystal molecules 310 may be formed of negative liquid crystal or positive liquid crystal. If needed, the liquid crystal molecules 310 may be formed by combination of negative liquid crystal and positive liquid crystal. The negative liquid crystal corresponds to liquid crystal whose dielectric anisotropy ($\Delta\epsilon = \epsilon// - \epsilon\perp$) is a negative (−) value, and the positive liquid crystal corresponds to liquid crystal whose dielectric ($\Delta\epsilon = \epsilon// - \epsilon\perp$) is a positive (+) value. A director of the negative liquid crystal is aligned in a direction being perpendicular to the direction of electric field, and a director of the positive liquid crystal is aligned in a direction being parallel to the direction of electric field.

As mentioned above, the liquid crystal molecules 310 may be formed of the mixture of various kinds of unit chemical substance, wherein the unit chemical substance may be formed of substance expressed as the following [Chemical Formula 4], but not necessarily, R1-A-R2      [Chemical Formula 4]

wherein each of 'R1' and 'R2' is selected from the group consisting of hydrogen (H), alkyl group, alkoxy group, alkenyl group, CN, F, Cl, CF$_3$, OCF$_3$, S, and NCS, and 'A' is selected from the group consisting of alkyl group, —COO—, —CF$_2$O—, bond structure of two or more different compounds among the above compounds, bond structure of two or more identical compounds among the above compounds, and repetitive unit of the bond structure.

The additive 320 prevents a reaction between the liquid crystal molecules 310 and impurities. In more detail, the additive 320 is formed of substance with good reactivity to the impurities in comparison to the chemical substances contained in the liquid crystal molecules 310. Accordingly, the impurities firstly reacts to the additive 320 before the impurities react to the liquid crystal molecules 310, whereby it is possible to prevent the properties of liquid crystal molecules 310 from being changed.

The additive 320 which serves as the above function may be formed of the compound expressed as the following [Chemical Formula 1] or the compound expressed as the following [Chemical Formula 2],

[Chemical Formula 1]

[Chemical Formula 2]

wherein 'R' is selected from the group consisting of hydrogen (H), alkyl group, alkoxy group, and alkenyl group.

The additive 320 is preferably not less than 50 ppm and less than 2000 ppm in the liquid crystal layer 300, and more preferably not less than 150 ppm and less than 2000 ppm in the liquid crystal layer 300, and even more preferably not less than 500 ppm and less than 2000 ppm.

If the additive 320 is less than 50 ppm, it is difficult to obtain the function of preventing the change of liquid crystal molecules 310. Thus, it is preferable that the additive 320 be not less than 50 ppm. Especially, if the additive 320 is not less than 150 ppm, it is better to overcome a problem of residual images. Also, if the liquid crystal layer 300 has a low content of additive 320, a stain might be in an edge of display device, that is, an edge stain might occur in the display device. In order to minimize the edge stain, the additive 320 is not less than 500 ppm, preferably.

According as the content of additive 320 is increased, it is possible to improve the efficiency of preventing the change of liquid crystal molecules 310. However, if the content of additive 320 is too high, it might cause a problem of lowering reliability of the liquid crystal layer 300. Especially, if the additive 320 is not less than 2000 ppm, the liquid crystal layer 300 may freeze at an extreme temperature below −20° C. In this respect, it is preferable that the additive 320 be less than 2000 ppm.

The sealant 400 is formed between the first substrate 100 and the second substrate 200, wherein the sealant 400 adheres the first substrate 100 and the second substrate 200 to each other.

Meanwhile, the LCD device of FIG. 3 shows one example of the IPS mode LCD device. However, the IPS mode LCD device according to the present invention is not limited to the structure shown in FIG. 3. That is, IPS mode LCD devices with various structures, to which the aforementioned liquid crystal layer 300 is capable of being applied, will be included in the scope of the present invention.

Figure 4:
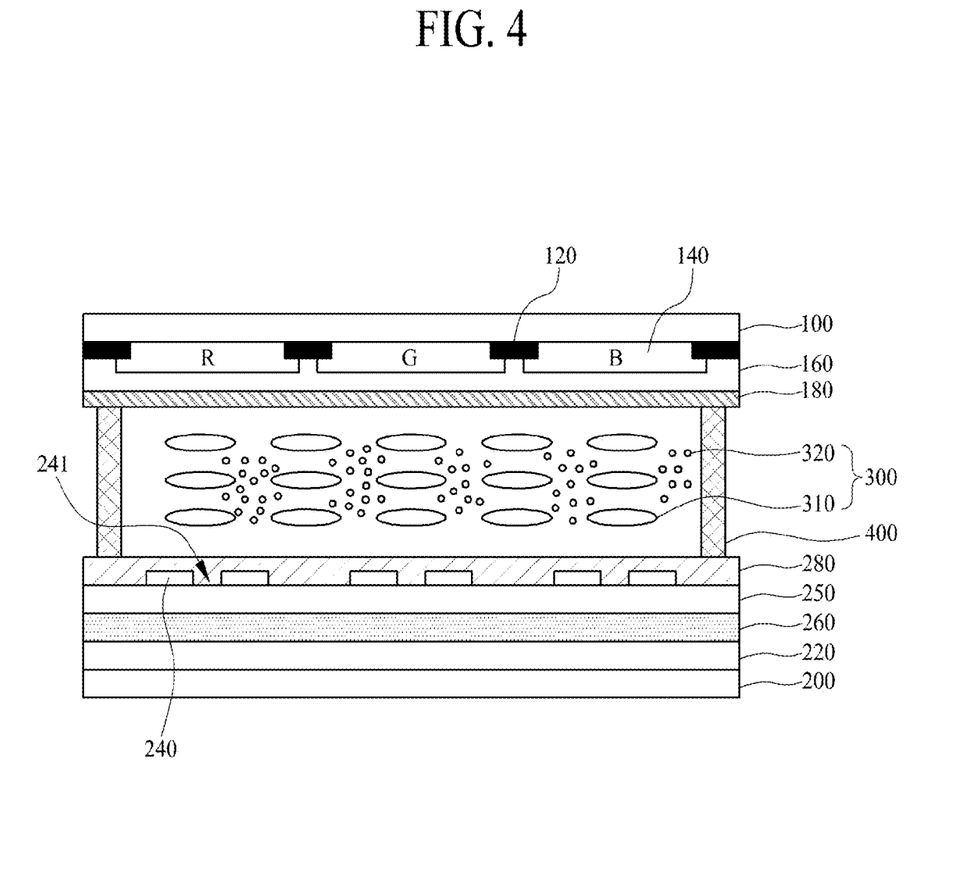
FIG. 4 is a cross sectional view illustrating an LCD device according to another embodiment of the present invention.

FIG. 4 is a cross sectional view illustrating an LCD device according to another embodiment of the present invention, which relates to an FFS mode LCD device. Except a change in structure of pixel electrode 240 and common electrode 260 for forming an electric field to drive liquid crystal molecules 310, the LCD device shown in FIG. 4 is identical in structure to that of the LCD device shown in FIG. 3, whereby a detailed description for the same parts will be omitted.

As shown in FIG. 4, an array layer 220 is formed on a second substrate 200, and a common electrode 260 is formed on the array layer 220. Then, an insulating layer 250 is formed on the common electrode 260, a pixel electrode 240 is formed on the insulating layer 250, and a second alignment film 280 is formed on the pixel electrode 240.

The insulating layer 250 is formed between the pixel electrode 240 and the common electrode 260. That is, the pixel electrode 240 is positioned on the insulating layer 250, and the common electrode 260 is positioned under the insulating layer 250. The pixel electrode 240 is provided with a slit 241, and the pixel electrode 240 is formed in a finger shape. Also, the common electrode 260 is formed in a plate shape. Accordingly, a fringe field is formed through the slit 241 of the pixel electrode 240, to thereby control an alignment direction of liquid crystal molecules 310.

The insulating layer 250 may be formed of an inorganic insulating material such as silicon nitride or silicon oxide, but not limited to these materials. For example, the insulating layer 250 may be formed of an organic insulating material such as acrylic polymer. If needed, the insulating layer 250 may be formed in a dual-layered structure including both inorganic insulating material and organic insulating material.

Although not shown, a common electrode with a slit may be formed on the insulating layer 250, and a plate-shaped pixel electrode may be formed under the insulating layer 250.

Meanwhile, the LCD device of FIG. 4 shows one example of the FFS mode LCD device. However, the FFS mode LCD device according to the present invention is not limited to the structure shown in FIG. 4. That is, FFS mode LCD devices with various structures, to which the aforementioned liquid crystal layer 300 is capable of being applied, will be included in the scope of the present invention.

Figure 5A:
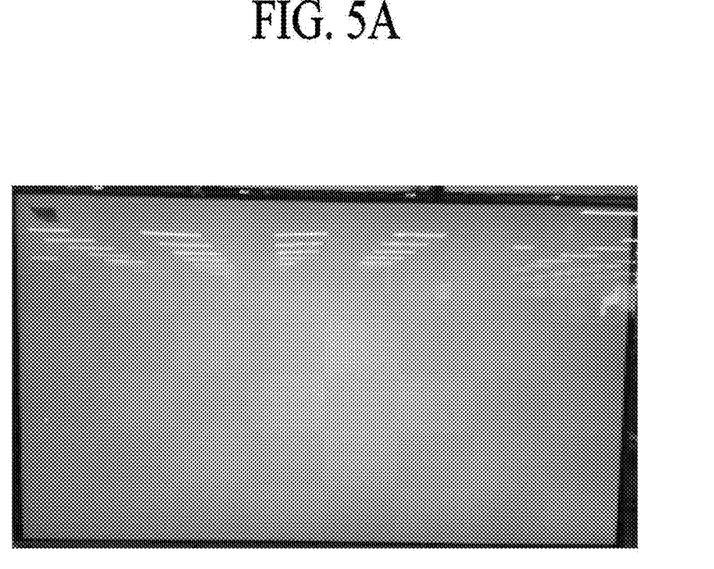
FIG. 5A is a photograph showing a residual image level of an IPS mode LCD device to which a liquid crystal layer having no additive is applied.
Figure 5B:
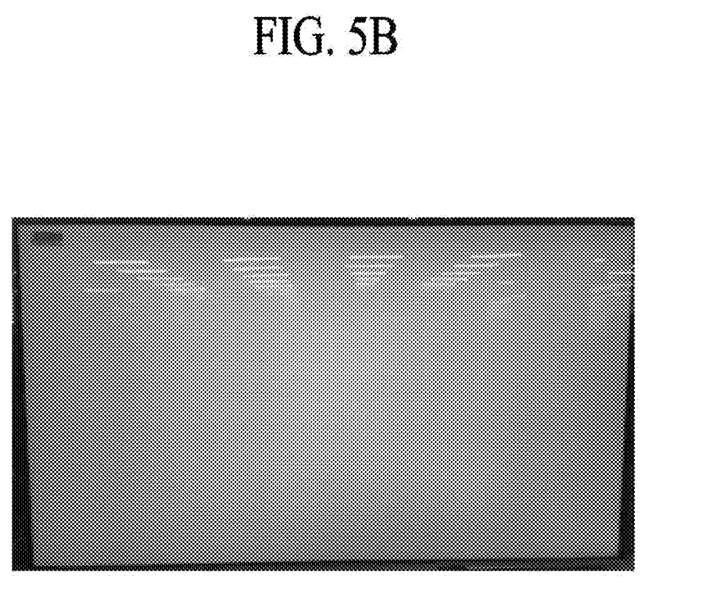
FIG. 5B is a photograph showing a residual image level of an IPS mode LCD device to which a liquid crystal layer having an additive is applied.

FIG. 5A is a photograph showing a residual image level of the IPS mode LCD device to which the liquid crystal layer having no additive is applied. FIG. 5B is a photograph showing a residual image level of the IPS mode LCD device to which the liquid crystal layer having the additive is applied. In case of FIG. 5B, the additive is formed of the compound expressed as the following [Chemical Formula 3].

[Chemical Formula 3]

FIGS. 5A and 5B show residual image levels (referred to as '1 hour residual image level') when 30 seconds have passed after a screen with white and black grid pattern is firstly maintained for 1 hour and then is changed to 127 gray. In FIG. 5A related to the liquid crystal layer having no additive, the grid pattern remains. Meanwhile, in FIG. 5B related to the liquid crystal layer having additive, the residual image scarcely remain.

Figure 6:
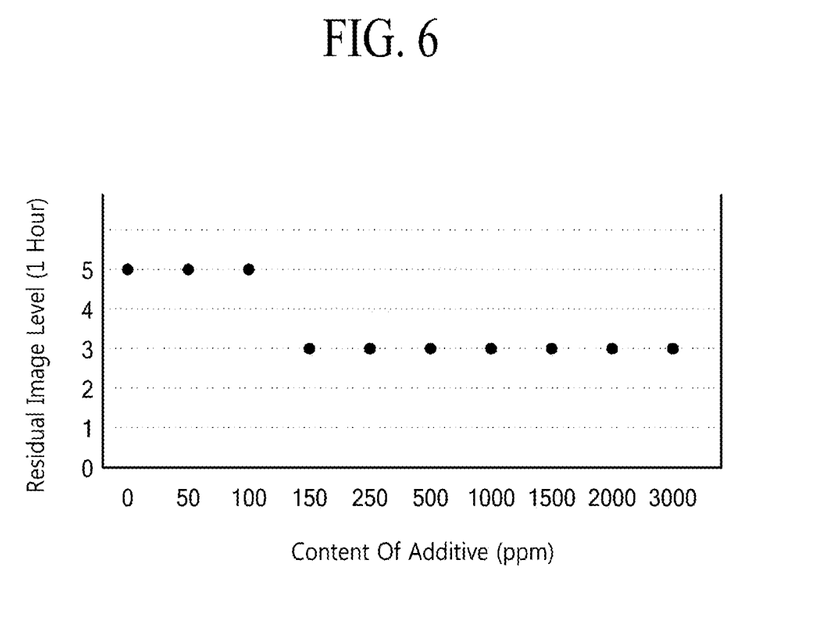
FIG. 6 is a graph showing a change of residual image level in accordance with the content of additive.

FIG. 6 is a graph showing the change of residual image levels in accordance with the content of additive. FIG. 6 is a graph showing the 1 hour residual image level in the IPS mode LCD device using the additive of the compound expressed as the above [Chemical Formula 3].

As shown in FIG. 6, while the 1 hour residual image level is '5' if the content of additive is not more than 100 ppm, the 1 hour residual image level is improved to '3' if the content of additive is not less than 150 ppm. In FIG. 6, the X-axis is the content of additive, and the Y-axis is the 1 hour residual image level. According as the number on the Y-axis becomes smaller, the residual image is more invisible, that is, the residual image level becomes better.

Figure 7:
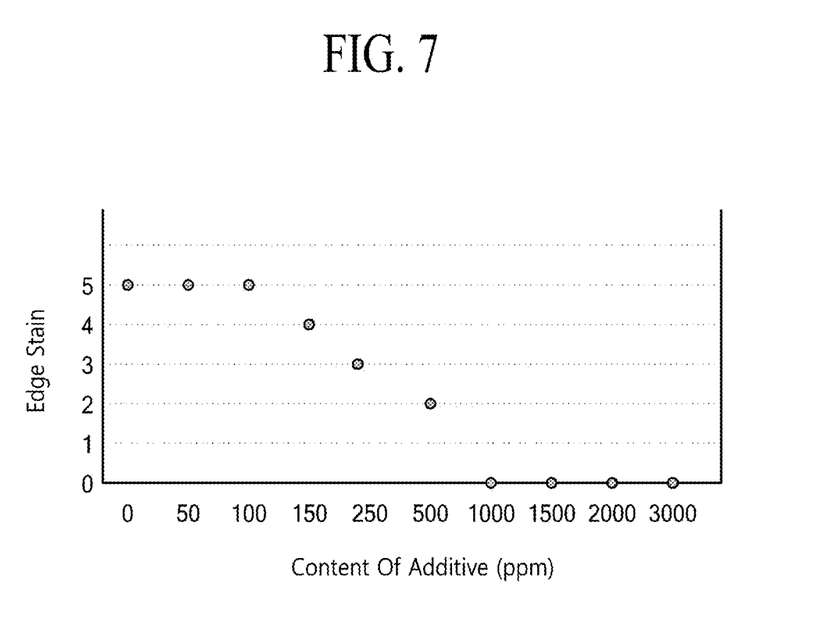
FIG. 7 is a graph showing a change of edge stain properties in accordance with the content of additive.

FIG. 7 is a graph showing the change of edge stain properties in accordance with the content of additive. FIG. 7 is a graph showing an edge stain level in the IPS mode LCD device using the additive of the compound expressed as the above [Chemical Formula 3].

As shown in FIG. 7, while the edge stain level is '5' if the content of additive is not more than 100 ppm, the edge stain level is improved to '4' if the content of additive is 150 ppm. Furthermore, if the content of additive is not less than 500 ppm, the edge stain level is considerably improved to '2'. If the content of additive is not less than 1000 ppm, the edge stain level is '0', that is, the edge stain is not shown.

As the LCD device is applied to various fields, the property for enduring the extreme temperature may be required in accordance to the application field of the LCD device. Generally, the property of enduring the extreme temperature of −20° C. is required for the LCD device. Herein, it is tested whether or not the liquid crystal layer freezes at −20° C. in accordance with the content change of the compound expressed as the above [Chemical Formula 3], and test results are shown in the following [Table 1].

TABLE 1

| Content of additive | 3000 ppm | 2000 ppm | 1500 ppm | 1000 ppm | 500 ppm | 150 ppm | 100 ppm | 0 ppm |
|---|---|---|---|---|---|---|---|---|
| Whether or not liquid crystal layer freezes at −20° C. | freezing | freezing | No freezing | No freezing | No freezing | No freezing | No freezing | No freezing |

As shown in the above [Table 1], if the content of additive is not less than 2000 ppm, the liquid crystal layer freezes.

According to the present invention, the additive 320 is included in the liquid crystal layer 300 so that it is possible to prevent the reaction between the liquid crystal molecules 310 and the impurities, thereby preventing the change in properties of the liquid crystal molecules 310. As a result, it is possible to realize the LCD device with the improved picture quality by overcoming the problem of residual image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
    a first substrate;
    a second substrate facing the first substrate; and
    a liquid crystal layer between the first and second substrates, wherein the liquid crystal layer consists essentially of:
    (a) liquid crystal molecules of one or more compounds having a formula of

R1-A-R2 wherein each of R1 and R2 is selected from the group consisting of hydrogen (H), alkyl group, alkoxy group, alkenyl group, CN, F, Cl, $CF_3$, $OCF_3$, S and NCS, and 'A' is selected from the group consisting of alkyl group, COO—, $CF_2O$—, bond structure of two or more different compounds thereof and repetitive unit of the bond structure, and
    (b) an additive, the additive being formed of a compound expressed as Chemical Formula 1 or Chemical Formula 2, wherein Chemical Formula 1 is wherein 'R' is selected from the group consisting of hydrogen (H), alkyl group, alkoxy group, and alkenyl group; and Chemical Formula 2 is wherein 'R' is selected from the group consisting of an alkyl group, alkoxy group, or alkenyl group,
    wherein the additive is not less than 500 ppm and less than 2000 ppm in the liquid crystal layer.

2. The liquid crystal display device according to claim 1, wherein pixel and common electrodes are formed on the second substrate.

3. The liquid crystal display device according to claim 2, wherein the pixel and common electrodes are alternately arranged to form a horizontal electric field therebetween.

4. The liquid crystal display device according to claim 2, wherein any one of the pixel and common electrodes is formed in a plate shape, and the other is formed in a finger shape in order to form a fringe field therebetween.

5. The liquid crystal display device according to claim 1, wherein the additive is not less than 1000 ppm and less than 2000 ppm in the liquid crystal layer.

* * * * *